United States Patent

Cook et al.

[11] Patent Number: 5,704,719
[45] Date of Patent: Jan. 6, 1998

[54] STREET SWEEPER BEARING WITH WEAR RESISTANT RESILIENTLY BIASED FACE SEAL

[75] Inventors: John P. Cook, Naperville; James P. Johnson, Sugar Grove, both of Ill.

[73] Assignee: Emerson Power Transmission Corp., Aurora, Ill.

[21] Appl. No.: 674,015

[22] Filed: Jul. 1, 1996

[51] Int. Cl.⁶ .............. F16C 33/78; F16J 15/32; F16J 15/34
[52] U.S. Cl. .............. 384/484; 277/65; 277/92; 384/481; 384/483; 384/489
[58] Field of Search .............. 384/477, 481, 384/482, 483, 484–489; 277/92, 136, 65, 83

[56] References Cited

U.S. PATENT DOCUMENTS

| | | | |
|---|---|---|---|
| 2,279,669 | 4/1942 | Friskney | 277/40 |
| 2,706,652 | 4/1955 | Berger | 277/41 |
| 2,757,052 | 7/1956 | Spurgeon | 384/489 |
| 3,073,657 | 1/1963 | Oxford | 384/481 |
| 3,109,660 | 11/1963 | Wahl et al. | 277/38 |
| 3,141,710 | 7/1964 | Lehman | 384/477 |
| 3,218,110 | 11/1965 | Conner | 384/481 |
| 3,410,566 | 11/1968 | Wiese | 277/81 R |
| 3,511,513 | 5/1970 | Dahlheimer | 277/82 |
| 3,762,727 | 10/1973 | Jackowski | 277/41 |
| 3,770,993 | 11/1973 | Schultenkamper | 384/484 |
| 3,953,038 | 4/1976 | Ludwig | 277/93 R |
| 4,094,512 | 6/1978 | Back | 277/27 |
| 4,351,533 | 9/1982 | Moore | 277/83 |
| 4,392,695 | 7/1983 | Miller | 384/477 |
| 4,428,586 | 1/1984 | Romero | 277/25 |
| 4,619,458 | 10/1986 | Mitumaru | 277/24 |
| 4,848,776 | 7/1989 | Winckler | 277/23 |
| 5,024,449 | 6/1991 | Otto | 277/37 |
| 5,121,999 | 6/1992 | Johnson et al. | 384/477 |
| 5,188,377 | 2/1993 | Drumm | 277/81.5 |

*Primary Examiner*—Thomas R. Hannon
*Attorney, Agent, or Firm*—Leydig, Voit & Mayer, Ltd.

[57] ABSTRACT

A bearing assembly having primary seals between inner and outer races on opposite sides of roller elements and an auxiliary face seal on at least one end thereof. The auxiliary seal includes a cap fixed to the inner race, and axially movable face seal member disposed within the cap for rotation therewith, and a resilient O-ring biasing and sealing member interposed between the face seal member and the cap for biasing the face seal into sealing contact with the outer race. The face seal, resilient sealing and biasing member, and cap define a multiplicity of seal barriers for preventing solid and liquid contaminants from entering the bearing assembly and reaching the primary seal.

27 Claims, 2 Drawing Sheets

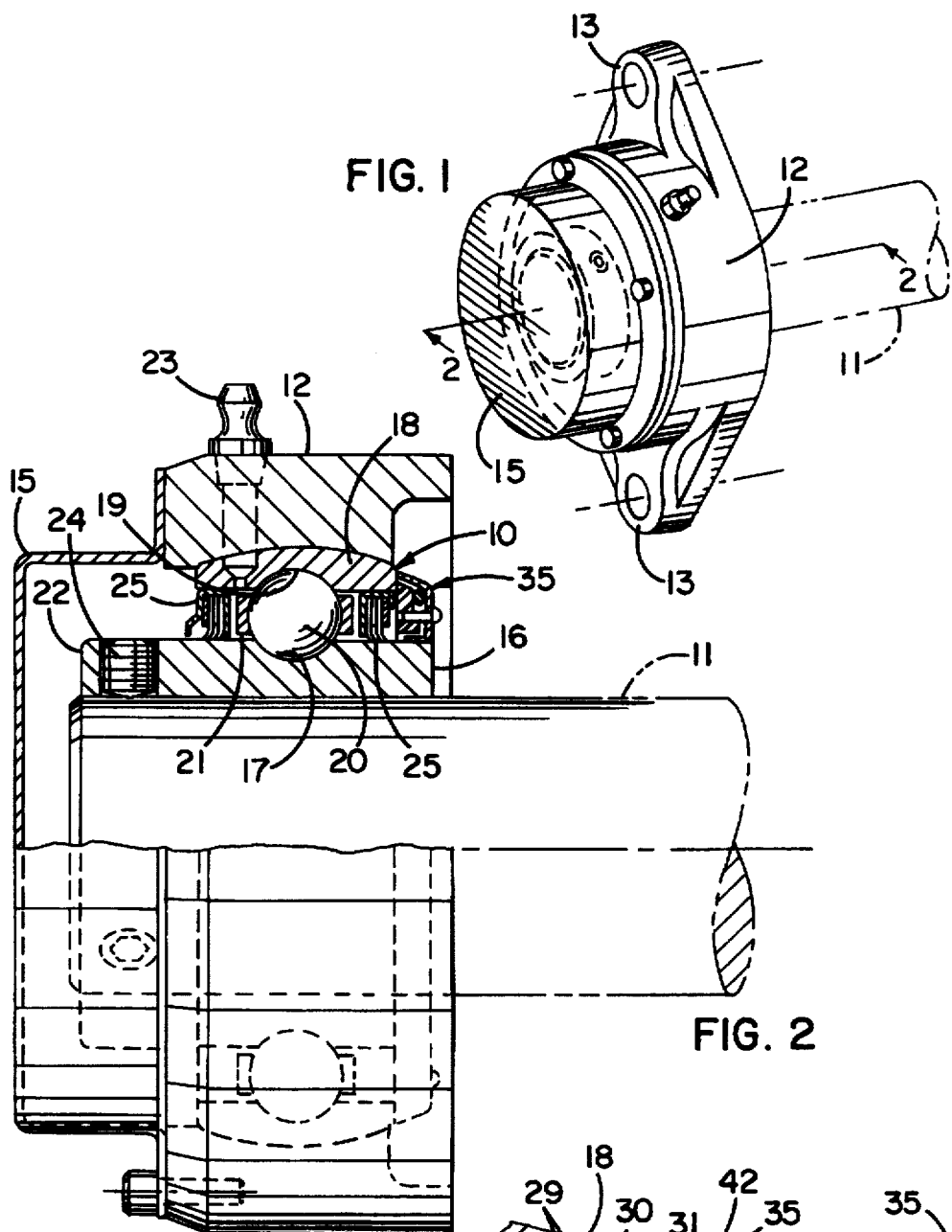
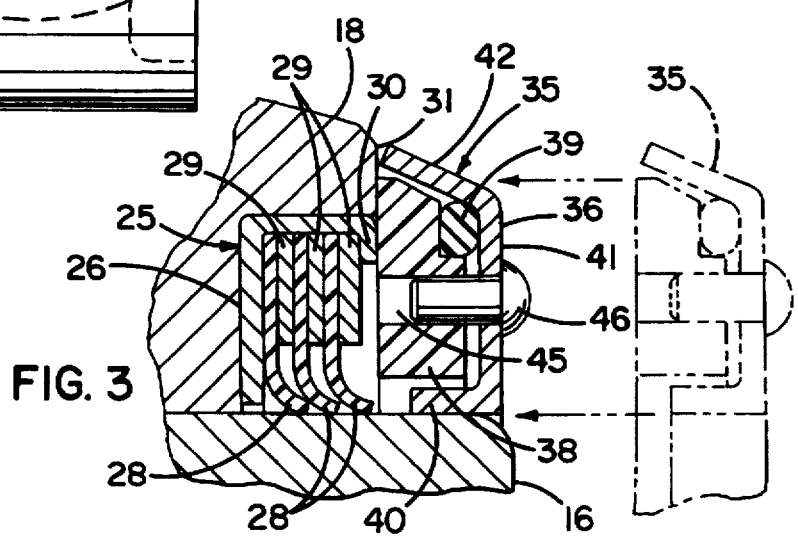

STREET SWEEPER BEARING WITH WEAR RESISTANT RESILIENTLY BIASED FACE SEAL

FIELD OF THE INVENTION

The present invention relates generally to bearing assemblies, and more particularly, to sealed bearing assemblies for use in contaminated working environments.

BACKGROUND OF THE INVENTION

Bearing assemblies used in many applications, such as street sweepers, are subject to various contaminants in the outside environment, such as dirt, sharp abrasive materials such as broken glass and metallic particles, water, and corrosive chemicals. The abrasive materials can migrate into the bearing, quickly causing wear and damage to the sealing and roller elements and ultimate bearing failure. Chemical contaminants can cause corrosion of metallic elements of the bearing assembly, which also adversely affects long-term reliable operation.

OBJECTS AND SUMMARY OF THE INVENTION

It is an object of the present invention to provide a bearing assembly which is adapted for more reliable operation in contaminated working environments.

Another object is to provide a bearing assembly as characterized above which has improved seals for more reliably preventing the migration of abrasive and liquid contaminants to the relatively movable internal bearing elements.

A further object is to provide a bearing assembly of the above kind in which the bearing seals are adapted to accommodate wear from abrasive materials to which the bearing is exposed during usage.

Still another object is to provide such a bearing assembly which is less susceptible to the adverse effects of corrosive chemicals.

Other objects and advantages of the invention will become apparent upon reading the following detailed description and upon reference to the drawings, in which:

BRIEF DESCRIPTION OF THE DRAWINGS

FIG. 1 is a perspective of an illustrative bearing assembly embodying the present invention;

FIG. 2 is an enlarged side elevational view, in partial section, of the illustrated bearing assembly taken in the plane of line 2—2 in FIG. 1;

FIG. 3 is an enlarged fragmentary section of the sealing arrangement of the illustrated bearing, showing in phantom an auxiliary seal of the bearing assembly in exploded fashion prior to mounting on the inner bearing race;

Figure 4:
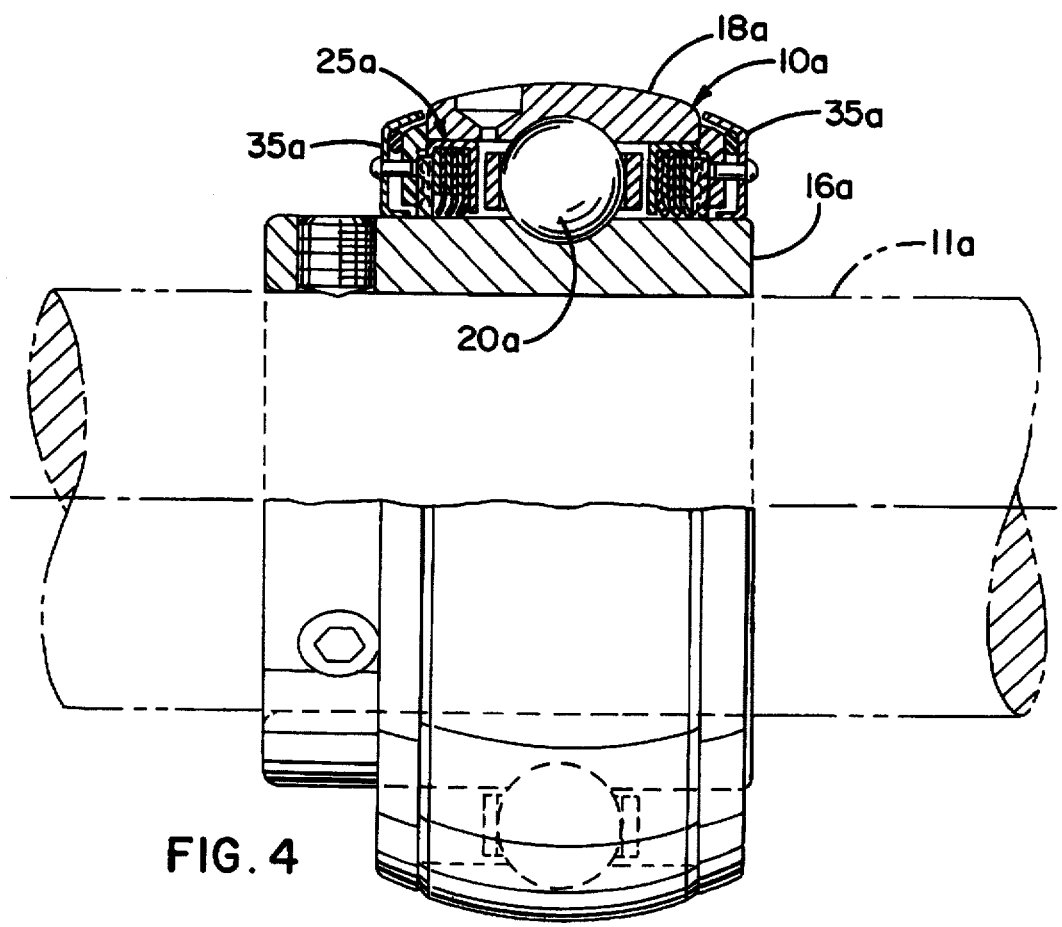
FIG. 4 is a side elevational view, in partial section, of an alternative embodiment of bearing assembly according to the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention. Moreover, while the bearing assemblies of the present invention have particular applicability for use in street sweepers wherein they are subject to contamination in the outside environment, the bearing assemblies may be used for other applications.

DETAILED DESCRIPTION OF THE PREFERRED EMBODIMENT

Referring now more particularly to the drawings, there is shown an illustrative bearing assembly 10 supporting the end of a rotary shaft 11 and retained within a conventional housing or pillow block 12. The housing 12 in this case has apertured mounting flanges 13 at opposite ends for enabling the housing 12 to be bolted or otherwise mounted onto a suitable wall or mounting panel. It will be understood that the rotary shaft 11 and associated bearing assembly 10 may be a part of any apparatus, such as a street sweeper, which may be exposed to abrasive and liquid contaminants during usage that can impede reliable bearing operation and cause ultimate bearing failure if the bearing assembly is not adequately sealed. An end cap 15 in this case is bolted to the end of the housing 12 for enclosing and protecting outer ends of the shaft 11 and bearing assembly 10 from the outside environment.

The bearing assembly 10 includes an annular inner race 16 having a grooved raceway 17 which preferably is wear hardened for extended bearing life. Surrounding the annular inner race 16 in spaced relation thereto is an annular outer race 18 having a grooved raceway 19 disposed in opposed relationship to the inner raceway 16, the raceways 17, 19 serving to receive in nesting relationship a plurality of spaced balls or rolling elements 20. The rolling elements 20 in this case are disposed in rolling element pockets of a conventional cage 21. For securing the bearing assembly 10 onto the shaft 11, the inner race 16 has an axial extension 22 formed with one or more threaded apertures through which respective set screws 24 may be advanced into secure engaging relation with the shaft 11. A grease fitting 23 is supported by the housing 12 for directing grease through the outer race 18 to lubricate the roller elements 20.

For sealing opposed ends of the bearing assembly 10, primary seals 25 are interposed between the inner and outer races on opposite axial sides of the roller elements 20. The primary seals 25 in this case are triple lip seals of a conventional type, each comprising an outer annular retainer 26 formed from a stamping or the like and fixed within the outer race 18 for retaining a plurality of lip seals 28, in this case three in number, formed of rubber or other resilient material. The illustrated lip seals 28 are secured within the retainer 26 adjacent respective spacers 29 and inner ends of the lip seals 28 are bent into sealing contact with the outer periphery of the relatively rotatable inner race 16. The retainer 26 has a radial flange 30 extending inwardly from an outer wall thereof in co-planar relation to an end face 31 of the outer bearing race 18 for retaining the lip seals 28 and spacers 29 in assembled relation. It will be understood that other primary seals of a conventional type could alternatively be used.

In accordance with the invention, at least one axial end of the bearing assembly most directly exposed to contaminants in the working environment is protected by an auxiliary face seal, which is mounted on one of the bearing races and adapted for zero clearance sealing contact with the other race and is self-compensating for wear from abrasive materials to which the bearing assembly is exposed. To this end, an auxiliary seal 35 is provided which includes a cap or end plate 36 mounted for rotation with the shaft 11, a non-metallic face seal member 38 disposed within the cap 36 for rotation therewith in sealing contact against the outer bearing race 18, and a resilient biasing member 39 interposed between the face seal member 38 and cap 36 for biasing said face seal member 38 into constant zero clearance, sealing contact with the outer bearing race notwithstanding wear occasioned by abrasive materials to which the bearing assembly is exposed during usage.

The cap 36 of the auxiliary seal 35 in this instance has an annular cup shape which defines an inwardly opening chamber facing the primary seal 25 and the end face 31 of the outer bearing race 18. The cap 36 has an inner cylindrical mounting flange 40 press fit or otherwise secured about the inner race 16, a radial wall 41 extending outwardly from the mounting flange 40, and an outer conical lip 42 tapered radially outwardly and in a direction toward the outer race end face 31 with a terminal end of the lip 42 being in close proximity to the end face 31. The cap 36 serves to exclude large solid contaminants from entering the seal and substantially prevents the ingress of liquid. In a street sweeping apparatus, for example, the cap 36 would protect the inner seal components from large debris such as glass, concrete, asphalt or organic materials (leaves, branches and the like), as well as substantially preventing water from entering the seal.

The face seal member 38 in this instance has an annular disk shape which defines a planar sealing surface positionable against the end face 31 of the outer bearing race 18 and the radial flange 30 of the primary seal retainer 26. The face seal member 38 preferably is made of high density polypropylene or other plastic material which will create a zero clearance seal when urged against the bearing race 18 and primary seal retainer 26, even after being subjected to wear from abrasive materials during prolonged usage.

For permitting axial movement of the face seal member 38 while being rotatably driven by the cap 36 and shaft 11, the face seal member 38 is formed with a plurality of axial holes 45 which are loosely positioned over respective axial pins 46 mounted in the radial wall 41 of the cap 36. The pins 46, which can take the form of rivets, barbed pins, screws, or the like, drive the face seal member 38 simultaneously with the cap 36 and the shaft 11, while the loose mounting of the face seal member 38 on the pins 46 permit its relative axial movement. It will be understood that the pins 46 can be fixed to the cap 36 and, if desired, appropriate means can be provided for preventing complete removal of the face seal member 38 from the pins 46 to facilitate handling and mounting of the auxiliary seal 35 on the inner bearing race 16 as a separate unit, as illustrated in phantom in FIG. 3.

The resilient bearing member 39 in this instance is a conventional non-metallic, O-ring interposed between the cap and an outer side of the face seal member 38. The face seal member 38 in this instance is formed with a notch in its outer side, which locates the O-ring in interposed relation between a corner of the face seal notch and a corner defined by the radial and tapered walls 41, 42 of the cap 36.

In operation of the shaft 11 in a contaminated working environment, it will be seen that the cap 36 of the bearing assembly 10 prevents large solid materials from entering the bearing assembly. The closely spaced relationship between the terminal end of the lip 42 and the end face 31 of the outer bearing race 18 further substantially prevents the entry of water or other liquid contaminants. In addition, further seals are established between face seal member 38 and the outer end face 31 of the outer race 18 and between O-ring biasing and sealing member 39 and the opposite side of the face seal member 38 and the cap 36. These further seals provide additional barriers to solid and liquid contaminates that may migrate between the cap and the outer bearing race so as to further protect the primary lip seal 25 from contamination. Furthermore, while the polymer face seal member 38 is resistant to damage from abrasive solid materials that might enter the bearing, the O-ring sealing and biasing member 39 urges the face seal member 38 into sealing contact with the outer bearing race even if the face seal member 38 experiences wear. The non-metallic material of the face seal member 38 and O-ring 39 furthermore minimizes corrosion problems from water and corrosive chemicals that might enter the bearing.

Figure 5:
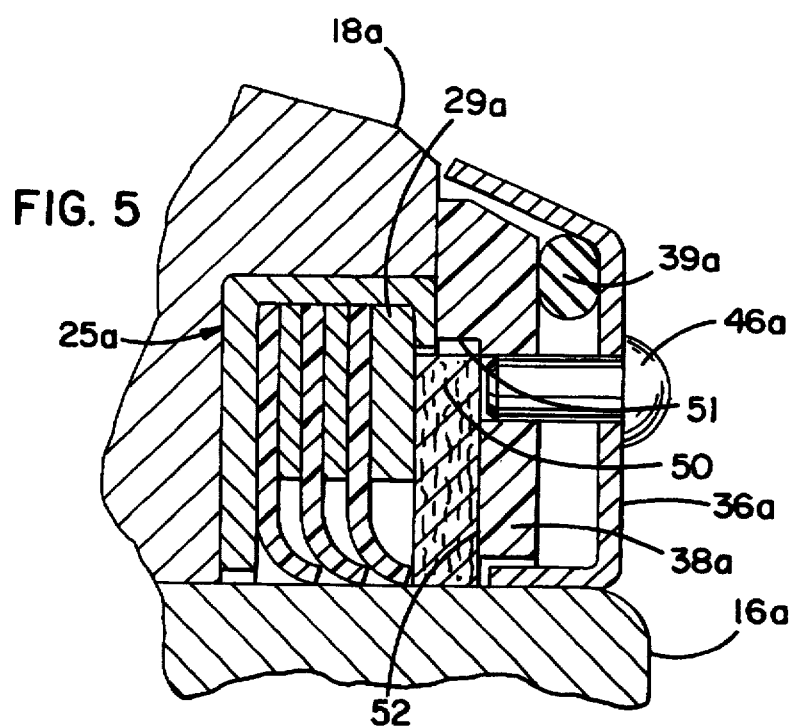
FIG. 5 is an enlarged fragmentary section of the sealing arrangement of the bearing assembly shown in FIG. 4.

Referring now to FIGS. 4 and 5, there is shown an alternative embodiment of bearing assembly 10a according to the present invention supporting a rotary shaft 11a intermediate its ends, wherein items similar to those described above have been given similar reference numerals with the distinguishing suffix "a" added. The bearing assembly 10a in this instance further includes a sealing member 50 made of a felt material bonded to an end face on an outer spacer 29a of the primary lip seal 25a such than an inner end thereof is in zero clearance sealing engagement with the relatively rotatable inner bearing race 16a. The felt sealing member 50 preferably has a flat disk shape, and the face seal member 38 is formed with an axial recess 51 within which the felt sealing member 50 is disposed. The face seal member recess 51 defines a radial sealing surface 52 which is forced against the felt seal member 50 by the resilient bearing and sealing O-ring member 39a, while being relatively rotatable with respect thereto during operation of the shaft 11. In this instance, the resilient O-ring member 39a is interposed between a co-planer outer surface of the face seal member 38a and the cap 36a. The operation of the bearing assembly 10a is similar to that described with respect to the previous embodiment, with the felt seal member 50 cooperating with the inner bearing race 16a and the face seal member surface 52 to provide further barriers to the entry of abrasive solid contaminants to the triple lip seal 25a. From the foregoing, it can be seen at the bearing assembly of the present invention is adapted for reliable operation in contaminated working environments. The auxiliary seals, including the outer cap, the face seal member, and the interposed biasing and sealing member combine to effectively prevent solid and liquid chemicals from migrating to the primary seals of the bearing assembly and accommodate wear from abrasive materials to which the bearing assembly may be exposed during usage.

What is claimed:

1. A bearing assembly comprising an inner ring for mounting on a shaft, an outer ring disposed concentrically about said inner ring, a plurality of roller elements interposed between said inner and outer rings, primary seals between said inner and outer races on opposite axial sides of said roller elements, an auxiliary seal on at least one side of said bearing assembly axially outwardly of one of said primary seals, said auxiliary seal including a cap fixed to one of said races, an axially movable face seal disposed within said cap, and a resilient member interposed between said face seal and said cap for biasing said face seal into sealing contact with the other of said races.

2. The bearing assembly of claim 1 in which said cap is fixed to said inner race, and said face seal is biased into sealing contact with an end face of the outer race.

3. The bearing assembly of claim 2 in which said cap is cup-shaped and is mounted on said inner race with an open end facing said one primary seal.

4. The bearing assembly of claim 3 in which said cup-shaped cap defines an inwardly opening chamber facing said one primary seal and said outer bearing race end face.

5. The bearing assembly of claim 4 in which said cup-shaped cap has an outer wall terminating in close spaced relation to said outer bearing race end face.

6. The bearing assembly of claim 1 in which said resilient member is an O-ring sealing member.

7. The bearing assembly of claim 6 in which said face seal is rotatable with said cap and shaft and is axially movable with respect to said cap and shaft under the biasing force of said resilient O-ring sealing member.

8. The bearing assembly of claim 6 in which said face seal is formed with a recess for locating said resilient sealing and biasing member in interposed position with said cap.

9. The bearing assembly of claim 8 in which said cap is formed with an outward radial wall and a wall tapering outwardly toward said outer bearing race, said cap walls defining a corner, and said resilient sealing member being interposed between said face seal and said corner of said cap.

10. The bearing assembly of claim 9 in which said face seal is formed with a notch which defines a corner for locating said resilient sealing member, and said resilient sealing member is forced between said corner of said face seal notch and said corner of said cap.

11. The bearing assembly of claim 1 in which each said primary seal is a lip seal fixed to said outer race and having at least one resilient lip in sealing contact with said inner race.

12. The bearing assembly of claim 11 in which said primary seal is a triple lip seal.

13. The bearing assembly of claim 1 in which said face seal is biased by said resilient member into engagement with both said outer bearing race end face and an end face of said one primary seal.

14. The bearing assembly of claim 1 in which said cap has at least one axial drive pin, and said face seal is formed with an axial aperture for loose mounting over said drive pin.

15. The bearing assembly of claim 14 in which said cap has an annular flange portion mounted on said inner race and a wall extending radially outwardly of said flange, and said drive pin is fixed in said radially extending wall.

16. The bearing assembly of claim 15 in which said cap is cup-shaped and defines an inwardly opening chamber facing said face seal, and said drive pin extends into said chamber.

17. The bearing assembly of claim 1 including a felt seal mounted in fixed relation to said outer race and having an inner lip in sealing contact with said inner race.

18. The bearing assembly of claim 17 in which said felt seal is disposed between said one primary seal and said face seal.

19. The bearing assembly of claim 18 in which said face seal has a face surface biased against a side of said felt seal by said resilient member.

20. The bearing assembly of claim 16 in which said face seal is formed with a recess for receiving said felt seal, and said face seal recess defines said face surface.

21. The bearing assembly of claim 17 in which said felt seal is bonded to an axial end of said one primary seal.

22. A bearing assembly comprising an inner ring for mounting on a shaft, an outer ring disposed concentrically about said inner ring, a plurality of roller elements interposed between said inner and outer rings, primary seals between said inner and outer races on opposite axial sides of said roller elements, an auxiliary seal on at least one side of said bearing assembly axially outwardly of one of said primary seals, said auxiliary seal including an end plate fixed to said inner race, an axially movable non-metallic face seal, and a non-metallic resilient sealing and biasing O-ring member interposed between said face seal and said end plate for biasing said face seal into sealing contact with said outer race.

23. The bearing assembly of claim 22 in which said face seal is rotatable relative to said outer race with said end plate, inner race, and shaft and is axially movable with respect to said end plate, inner race, and shaft under the biasing force of said resilient O-ring biasing and sealing member.

24. The bearing assembly of claim 23 in which said face seal is biased by said resilient member into engagement with both said outer bearing race end face and an end face of said one primary seal.

25. The bearing assembly of claim 22 in which said end plate has at least one axial disposed drive pin, and said face seal is formed with an axial aperture for loose mounting over said drive pin.

26. The bearing assembly of claim 22 in which said end plate has a lip terminating in closely spaced relation to said outer bearing race end face.

27. The bearing assembly of claim 22 in which said face seal is formed with a recess for locating said resilient sealing and biasing member in interposed position with said end plate.

* * * * *